(12) United States Patent
Mullen et al.

(10) Patent No.: US 8,205,315 B2
(45) Date of Patent: Jun. 26, 2012

(54) COMPOSITE TUBE ASSEMBLIES AND METHODS OF FORMING THE SAME

(75) Inventors: James M. Mullen, Mukilteo, WA (US); Daniel M. Valleroy, Snohomish, WA (US); Daniel L. Moore, Edmonds, WA (US)

(73) Assignee: Tyee Aircraft, Everett, WA (US)

( * ) Notice: Subject to any disclaimer, the term of this patent is extended or adjusted under 35 U.S.C. 154(b) by 1124 days.

(21) Appl. No.: 11/981,569

(22) Filed: Oct. 30, 2007

(65) Prior Publication Data

US 2008/0157519 A1 Jul. 3, 2008

Related U.S. Application Data

(60) Provisional application No. 60/856,224, filed on Nov. 1, 2006.

(51) Int. Cl.
*B23P 11/02* (2006.01)
*F16B 7/22* (2006.01)

(52) U.S. Cl. ............... 29/447; 29/446; 29/458; 403/341; 403/286; 403/293; 403/404; 285/239; 280/93.511

(58) Field of Classification Search ............ 29/446, 29/451, 458, 447; 403/277, 290, 341, 370, 403/374.4, 404, 286, 293, 305; 285/239; 280/93.511
See application file for complete search history.

(56) References Cited

U.S. PATENT DOCUMENTS

| | | | | |
|---|---|---|---|---|
| 3,752,981 A | * | 8/1973 | Jaszczak | 250/368 |
| 3,850,722 A | * | 11/1974 | Kreft | 156/172 |
| 4,185,472 A | * | 1/1980 | Yates et al. | 464/181 |
| 4,469,730 A | | 9/1984 | Burhans | |
| 4,582,444 A | * | 4/1986 | Miskinis | 403/16 |
| 4,792,320 A | * | 12/1988 | Nickel | 464/181 |
| 4,848,957 A | | 7/1989 | Umeda | |
| 4,849,152 A | * | 7/1989 | Rumberger | 264/308 |
| 5,318,374 A | | 6/1994 | Rumberger | |

FOREIGN PATENT DOCUMENTS

| | | |
|---|---|---|
| DE | 40 29 008 C1 | 10/1991 |
| FR | 2 309 453 | 11/1976 |
| FR | 2652872 A1 * | 4/1991 |
| GB | 1 551 223 A | 8/1979 |
| GB | 2 247 930 A | 3/1992 |

OTHER PUBLICATIONS

International Search Report for International Application No. PCT/US2007/023123 dated Apr. 2, 2008.
Anonymous, Load Transmitting Components, Research Disclosure, dated Jun. 1997, vol. 398, No. 29.

* cited by examiner

*Primary Examiner* — Essama Omgba
(74) *Attorney, Agent, or Firm* — Christie, Parker & Hale, LLP

(57) ABSTRACT

A composite tube assembly and a method of making the same are provided. The composite tube assembly includes a composite tube and a fitting penetrating the composite tube. The fitting includes a reduced diameter section surrounded by a reduced diameter tube portion of the tube. A bolstering structure surrounds this reduced diameter tube portion. The method includes inserting the fitting into the composite tube, heating the tube portion surrounding the fitting to soften the same, radially compressing the tube portion onto the fitting reduced diameter section, and providing a bolstering structure surrounding the compressed tube portion.

9 Claims, 4 Drawing Sheets

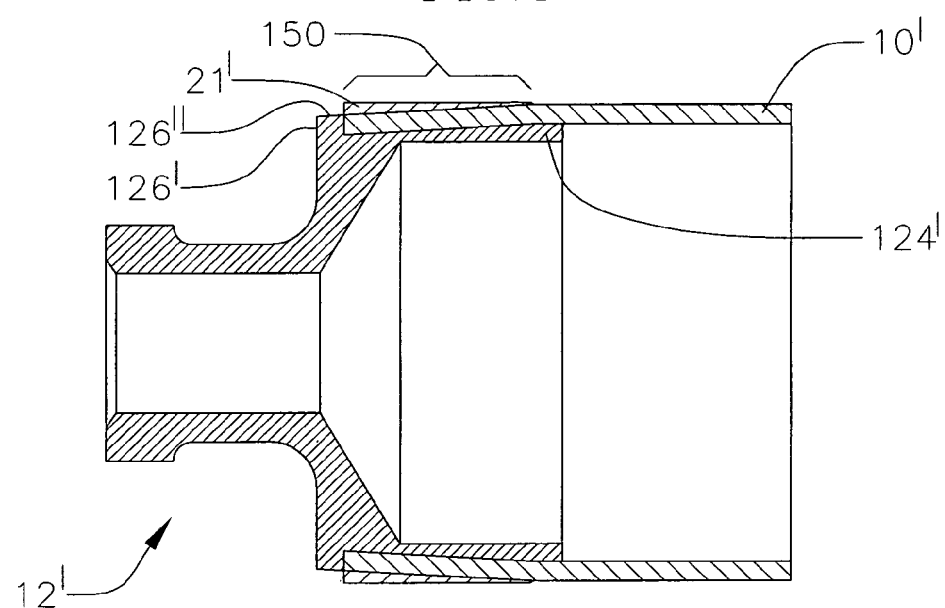
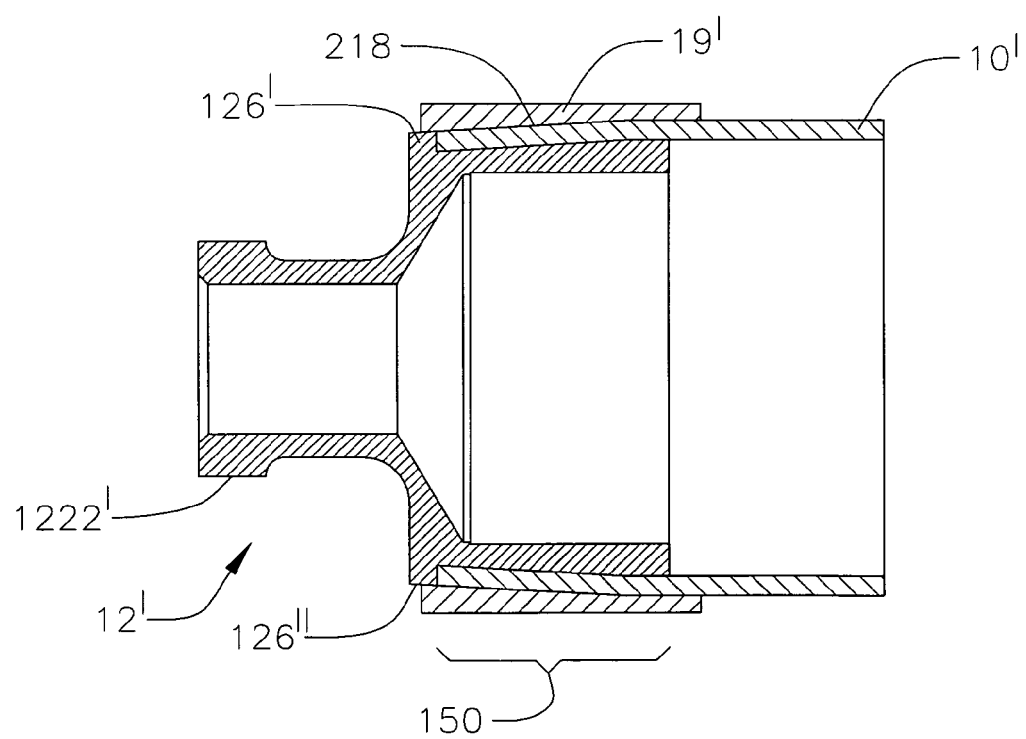

COMPOSITE TUBE ASSEMBLIES AND METHODS OF FORMING THE SAME

CROSS-REFERENCE TO RELATED APPLICATION

This application claims the benefit of U.S. Provisional Patent Application Ser. No. 60/856,224, filed Nov. 1, 2006, the disclosure of which is incorporated herein by reference.

BACKGROUND OF THE INVENTION

The present invention relates generally to composite tube assemblies and more particularly to composite tube assemblies having form locking or fittings.

Carbon composite offers high stiffness and/or strength-to-weight ratios. Composite tube assemblies are used for transferring loads in structures such as aircraft or spacecraft. Other applications include control rods, containers, ducts, panel inserts, torque tubes, etc.

In vehicles such as an aircraft, it is beneficial to use the composite tube assemblies rather than assemblies primarily composed of metal. The composite tube assemblies are lighter in weight, more resistant to corrosion, stronger and more inert relative to substantially metallic assemblies. Composite tube assemblies may be used in an overhead luggage bin (or stow bin) assemblies in an aircraft to provide structural support both when the bin is in an open configuration and when it is closed. The composite tube assemblies may also facilitate installation of the stow bin in the aircraft. The composite tube assemblies may also be used as structural members in vehicle frames.

When a tube composed of carbon composite is connected to a push-pull load a metallic end fitting and/or a tubular insert is often used as a connector between the tube and the push-pull load. However, carbon composite may have a rate of thermal expansion and/or negative thermal expansion (i.e. contraction) substantially different from that of the metallic end fitting. Such a difference in the rate of thermal expansion and/or contraction can stress a connection between the tube and the metallic end fitting and progressively weaken the connection over time. Consequently, a robust connection between a composite tube and a fitting is desired.

SUMMARY OF THE INVENTION

In an exemplary embodiment, a composite tube assembly is provided including a composite tube having an end and a fitting. The fitting includes a first end opposite a second end. The fitting second end includes a first outer diameter. The fitting also includes a tapered outer surface section and a reduced diameter outer surface section extending from the tapered outer surface section between the first and second ends. The reduced diameter outer surface section has a second diameter smaller than the first diameter. The reduced diameter outer surface section may be a constant diameter outer surface section. The fitting penetrates a portion of the tube through the tube end. The second end and the tapered and reduced diameter outer surface sections are interior of the tube and the tube includes a portion not penetrated by the fitting having an inner surface having a third diameter. The portion of the tube penetrated by the fitting includes a section mated to the reduced diameter section of the fitting and has an inner surface having a fourth diameter smaller than the third diameter. A bolstering structure surrounds and engages the composite tube section. In another exemplary embodiment, the fitting includes an annular flange such that the composite tube end abuts the flange. In a further exemplary embodiment, the bolstering structure includes an outer surface having a diameter being substantially the same as an outer surface diameter of the composite tube portion not penetrated by the fitting. In yet another exemplary embodiment, the bolstering member includes a composite material wrapped around the composite tube section mated to the reduced diameter section of the fitting. In yet a further exemplary embodiment, the bolstering member further includes an annular collar surrounding the wrapped material. In an alternate exemplary embodiment, the bolstering structure is an annular collar. In another exemplary embodiment, at least a groove is formed on the reduced diameter outer surface section of the fitting to accommodate a resin or adhesive for bonding the composite tube to the reduced diameter section outer surface. An end fitting may be coupled to the fitting through the first end. In an exemplary embodiment, the fitting first end is exterior of the composite tube.

In another exemplary embodiment, a composite tube assembly is provided. The assembly includes a composite tube having an end and a fitting. The fitting includes a first end opposite a second end. The fitting second end includes a first outer diameter. The fitting also includes a tapered outer surface section between the first and second ends which tapers radially inward in a direction toward the first end. The fitting penetrates a portion of the tube through the tube end such that the second end and the tapered outer surface section are interior of the tube. The tube includes a portion not penetrated by fitting. The tube portion penetrated by the fitting includes a section mated to the tapered outer surface of the fitting. A bolstering structure surrounds and engages the composite tube section mated to the tapered outer surface of the fitting. In another exemplary embodiment, the fitting also includes a constant diameter outer surface section extending from second end toward the first end. In yet another exemplary embodiment, the tapered outer surface section extends from the constant diameter outer surface section toward the first end. In a further exemplary embodiment, a flange extends from the fitting such that the tapered outer surface extends from the constant diameter section to the flange and the composite tube end abuts said flange. In another exemplary embodiment, the tapered outer surface section includes at least a groove to accommodate an adhesive or a resin bonding the composite tube to said fitting. An end fitting may be coupled to the fitting through the first end. In an exemplary embodiment, the first end is exterior of the composite tube.

In a further exemplary embodiment, a method for forming a composite tube assembly is provided. The method includes providing a composite tube including an end and being formed from fibers and resin. The method further includes providing a fitting including a first end opposite a second end, where the second end includes a first outer surface diameter, and where the fitting includes a reduced diameter outer surface section between the first and second ends having a diameter smaller than the first outer surface diameter. The method further includes inserting the fitting second end and the reduced diameter section into the composite tube through the end, whereby an end portion of the tube surrounds the reduced diameter section of the fitting. The method also includes heating the tube end portion to soften the resin, radially compressing the tube end portion onto the reduced diameter section of the fitting, and providing a bolstering structure surrounding the compressed tube end portion. In a further exemplary embodiment, the fitting reduced diameter section is a tapered outer surface annular section which tapers radially inward in a direction toward the first end. In yet a further exemplary embodiment, the fitting further includes a constant diameter outer surface section extending from the second end toward the first end, and the fitting also includes a flange extending from the fitting where the tapered outer surface extends from the constant diameter section to the flange and where the fitting second end is inserted into the composite tube through the composite tube end until the composite tube end abuts the flange. In an exemplary embodiment, a bolstering structure is formed by wrapping the compressed tube portion with a material including fibers and resin, and curing the wrapped material onto the compressed tube portion. In yet a further exemplary embodiment, the bolstering structure further includes a collar placed over the wrapped material. In an alternate exemplary embodiment, the bolstering structure includes a collar surrounding and engaging the compressed tube end portion. In another exemplary embodiment, the compressed tube portion includes a tapered outer surface, and a collar forming the bolstering structure is provided having a tapered inner surface for engaging the tapered outer surface of the compressed tube portion. In yet another exemplary embodiment, the method may also include providing an adhesive between the tube end portion and the fitting reduced diameter section. At least a groove may be formed on the reduced outer surface diameter section of the fitting to accommodate the resin of the composite tube and/or the adhesive. An end fitting may also be coupled to the fitting through the fitting first end.

BRIEF DESCRIPTION OF THE DRAWINGS

These and other features, aspects, and advantages of the present invention will become better understood with regard to the following description, appended claims, and accompanying drawings where:

FIG. 4 is a top view of an end fitting incorporated in an exemplary embodiment fitting incorporated in an exemplary embodiment tube assembly of the present invention;

FIG. 5 is an exploded partial perspective view of an exemplary embodiment tube assembly of the present invention prior to the attachment of a composite tube end to an exemplary embodiment fitting;

FIG. 8 is a partial cross-sectional view of an end section of another exemplary embodiment tube assembly of the present invention; and FIG. 9 is a cross-sectional view of a partial end section of yet another exemplary embodiment tube assembly of the present invention.

DETAILED DESCRIPTION OF THE INVENTION

In the following detailed description, certain exemplary embodiments of the present invention are shown and described, by way of illustration. As those skilled in the art would recognize, the described exemplary embodiments may be modified in various ways, all without departing from the spirit or scope of the present invention. Accordingly, the drawings and description are to be regarded as illustrative in nature, rather than restrictive.

Figure 1:
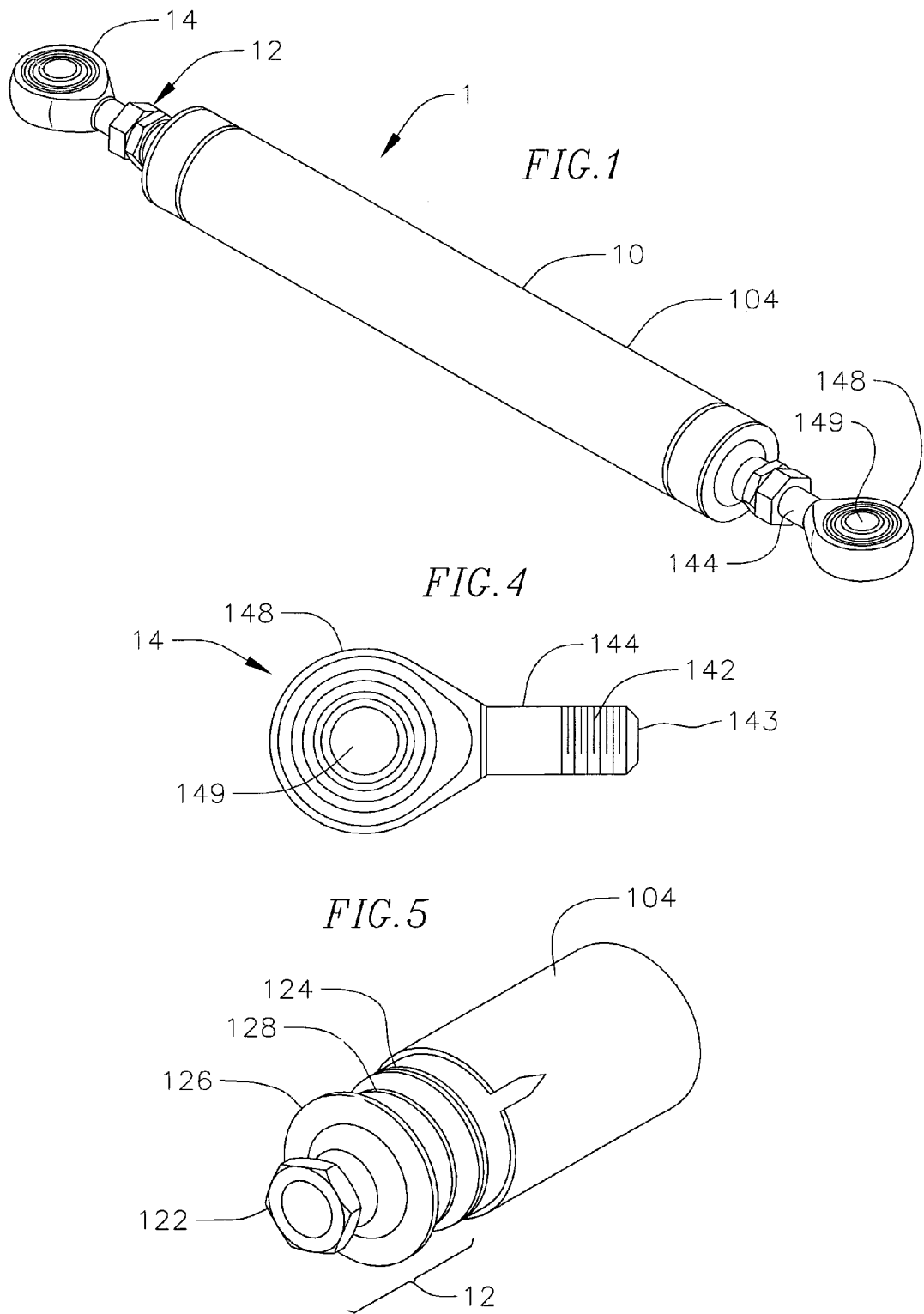
FIG. 1 shows a perspective view of a composite tube assembly according to an exemplary embodiment of the present invention.
Figure 3:
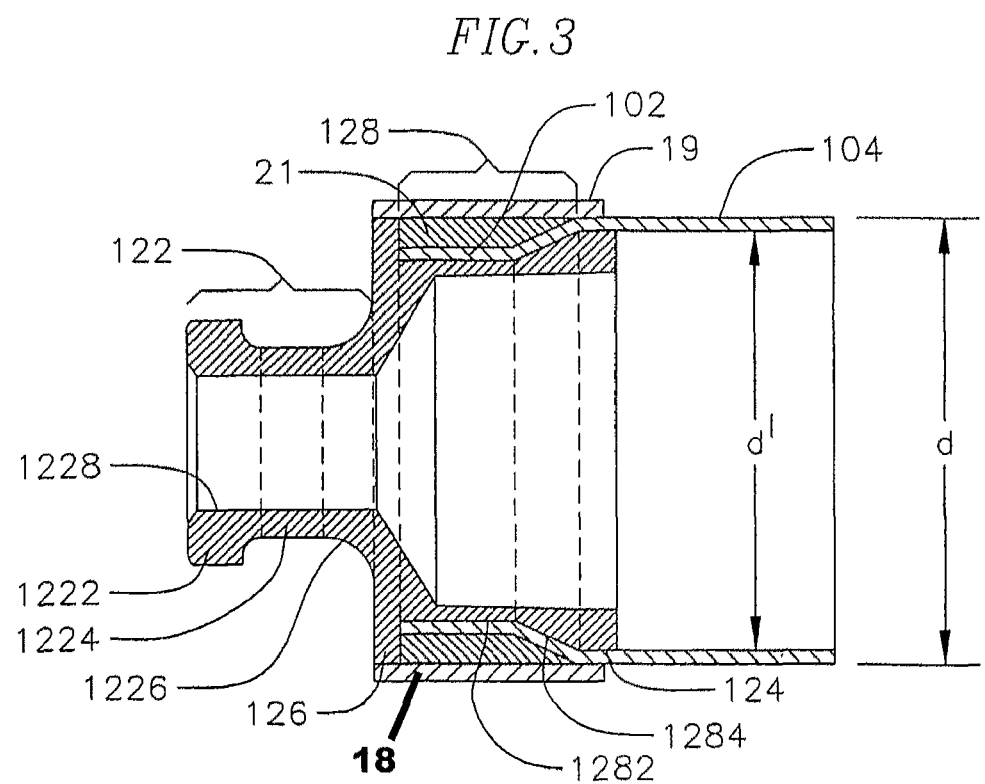
FIG. 3 is a partial cross-sectional view of an end section of an exemplary embodiment tube assembly of the present invention.

With reference to FIG. 1, a composite tube assembly 1, according to an embodiment of the present invention, includes a composite tube 10. A fitting (i.e., insert) 12 and an end fitting 14 are located at each end of the composite tube 10. With reference to FIG. 3, the composite tube assembly 1 may further include a bolstering structure 18 at one end (or both ends) of the composite tube 10 for reinforcing a connection between the fitting 12 and the end of the composite tube 10.

The composite tube 10 is a hollow and substantially tubular structure. With reference to FIGS. 1 and 3, the composite tube 10 has a body 104 having a substantially uniform outer diameter d and a substantially uniform inner diameter d'.

The composite tube 10 may be produced by winding composite fibers in a form of a filament (and/or a tape) having an epoxy resin over a tubular mandrel. Any of a number of suitable machines known to those skilled in the art can be used for this purpose. The composite fibers may be wound along a direction that is substantially helical with respect to a longitudinal axis of the composite tube 10. In one embodiment, the composite fibers are wound at a very small helical angle (or angles) with respect to the longitudinal axis. However, embodiments of the composite tube 10 are not limited thereto. That is, the composite tube 10 may be produced by winding filaments and/or pre-impregnated composite tapes in any known manner.

Figure 2:
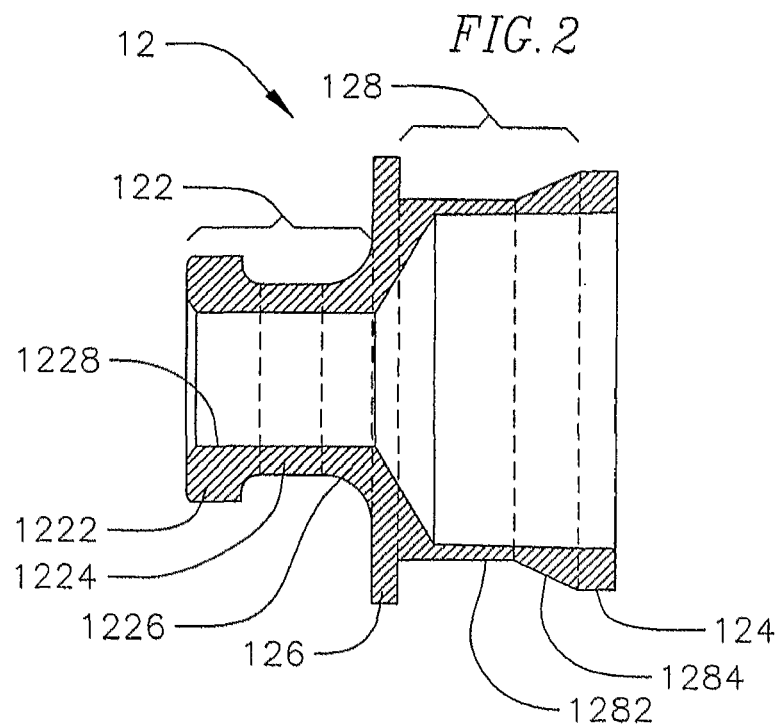
FIG. 2 is a cross-sectional view of a fitting incorporated in an exemplary embodiment composite tube assembly of the present invention.

With reference to FIGS. 2 and 3, each fitting 12 has a first end portion 122, a second end portion 124, and a flange (or abutment) 126 located between the first end portion 122 and the second end portion 124. The fitting 12 further has a reduced diameter portion 128 located between the flange 126 and the second end portion 124.

The first end portion 122 includes an entry portion 1222, a cylindrical portion 1224 and an annular tapered portion 1226. The entry portion 1222 has a bore having internal screw threads 1228. The threads 1228 extend from an open end of the entry portion 1222 along the length of the entry portion 1222 towards the cylindrical portion 1224. As such, the entry portion 1222 may be embodied by a jam nut having an hexagonal outer circumference and a circular, internally threaded inner circumference.

The cylindrical portion 1224 is located between the entry portion 1222 and the annular tapered portion 1226. The cylindrical portion 1224 has an inner diameter substantially equal to an inner diameter of the entry portion 1222. In one embodiment, at least a portion of a bore of the cylindrical portion 1224 is threaded. In one embodiment, the bore of the cylindrical portion 1224 is substantially unthreaded.

The annular tapered portion 1226 is located between the cylindrical portion 1224 and the flange 126. A first end of the annular tapered portion 1226 abuts the cylindrical portion 1224 and has an inner diameter and an outer diameter substantially equal to the inner diameter and an outer diameter, respectively, of the cylindrical portion 1224. A second end of the annular tapered portion 1226 is flared and abuts the flange 126. At its widest, the second end of the annular tapered portion 1226 has an outer diameter larger than the outer diameter of the cylindrical portion 1224.

The flange 126 has a substantially annular shape. An outer diameter of the flange 126 is larger than the outer diameter of the annular tapered portion 1226. The outer diameter of the flange 126 is also larger than the reduced diameter portion 128 of the fitting 12. With reference to FIG. 3, the outer diameter of the flange 126 may be substantially equal to the outer diameter d of the body 104 of the composite tube 10. In another embodiment, the outer diameter of the flange 126 is greater (or less) than the outer diameter d of the body 104 of the composite tube 10.

The reduced diameter portion 128 of the fitting 12 is located between the flange 126 and the second end portion 124. The outer diameter of the reduced diameter portion 128 is smaller than an outer diameter of the second end portion 124. In one embodiment, the reduced diameter portion 128 may have a substantially unthreaded outer surface or may have a grooved outer surface for accommodating a resin from the composite tube and/or an adhesive which bonds the tube to the fitting. In an exemplary embodiment, the reduced diameter portion 128 may include a cylindrical portion which defines a reduced diameter section 1282 and a tapered portion 1284.

The cylindrical portion 1282 is located between the flange 126 and the tapered portion 1284. The cylindrical portion 1282 has an outer diameter smaller than the outer diameter of the flange 126.

The tapered portion 1284 is located between the cylindrical portion 1282 and the second end portion 124. A first end of the tapered portion 1284 abuts the cylindrical portion 1282 and has an inner diameter and an outer diameter substantially equal to an inner diameter and the outer diameter, respectively, of the cylindrical portion 1282. A second end of the tapered portion 1284 is flared and abuts the second end portion 124. At its widest, the second end of the tapered portion 1284 has an outer diameter larger than the outer diameter of the cylindrical portion 1282 but smaller than the outer diameter of the flange 126. An inner diameter and the outer diameter of the second end of the tapered portion 1284 are substantially equal to an inner diameter and an outer diameter, respectively, of the second end portion 124.

The second end portion 124 abuts the wider second end of the tapered portion 1284. The second end portion 124 has a substantially annular shape. With reference to FIG. 3, the outer diameter of the second end portion 124 is substantially equal to the inner diameter d' of the body 104 of the composite tube 10. In one exemplary embodiment, the second end portion 124 has a substantially unthreaded outer surface.

The fitting 12, in an exemplary embodiment includes a material having an intermediary rate of thermal expansion and/or contraction relative to the composite tube 10 and the end fitting 14. In one embodiment, the fitting 12 includes titanium.

With reference to FIGS. 1 and 4, each end fitting 14 is a connector such as for example an eye bolt, clevis, or the like. In an exemplary embodiment, the end fitting 14 has external screw threads 142 having a major and a minor diameter. The external screw threads 142 extend from a free end 143 of the end fitting 14 along the length of the end fitting towards a body 144 of the end fitting. The external screw threads 142 are of an appropriate size for mating with the internal screw threads 1228 of the threaded portion 122 of the fitting 12. In an exemplary embodiment, the body 144 of the end fitting 14 includes a connector terminating in an eye 148 with an anti-friction bearing 149. Alternatively, the body 144 of the end fitting 14 may terminate in a manner suitable for attachment to another element such as a threaded or socketed connector.

To form the tube assembly, the composite tube 10 if longer than desired (e.g., for a given application), is shortened at either one or both ends. A cutter such as an abrasive cutter or any other suitable instrument may be used for this purpose.

With reference to FIG. 5, the second end portion 124 and the reduced diameter portion 128 of the fitting 12 are inserted into an end of the composite tube 10 until the flange 126 of the fitting 12 is in substantial alignment with the end of the composite tube 10. In an exemplary embodiment, prior to the insertion of the reduced diameter portion 128 and the second end portion 124 into the composite tube 10, the corresponding end of the composite tube 10 is axially notched at one or more portions of the tube to facilitate, as will be described in more detail below, an engaging of the composite tube 10 with the reduced diameter portion 128 of the fitting 12. A water jet or any other suitable instrument may be used for this purpose.

In a further exemplary embodiment, the reduced diameter portion 128 of the fitting 12 is coated with an adhesive prior to the insertion of the reduced diameter portion 128 and the second end portion 124 into the composite tube 10. Alternatively, the inner surface portion of the end portion of the composite tube that will interface with the fitting reduced diameter portion is also coated with the adhesive. In other exemplary embodiments, both the fitting and composite tube are coated with the adhesive.

A reduced diameter portion 102 of the composite tube 10 is formed to engage the reduced diameter portion 128 of the fitting 12. The reduced diameter portion 102 of the composite tube 10 has a smaller outer diameter than the flange 126. The composite tube 10 is thereby secured to the reduced diameter portion 128 of the fitting 12 at the reduced diameter portion 102 of the composite tube 10.

The reduced diameter portion 102 of the composite tube 10 is formed by heating the end of the composite tube 10 into which the fitting 12 was inserted to a temperature sufficient to the composite tube end to become thermoplastic or moldable, as for example by softening the resin forming the composite tube. A heated die or any other suitable instrument may be used for this purpose. Once the end of the composite tube 10 is in a moldable state, it is then deformed to engage the reduced diameter portion 128 of the fitting 12. That is, the end of the composite tube 10 is deformed to have a shape and dimension substantially conforming to a shape and dimension, respectively, of the reduced diameter portion 128 of the fitting 12. The reduced diameter portion 102 of the composite tube 10 is thereby formed. As the reduced diameter portion 102 of the composite tube 10 cools, it compresses radially towards to the reduced diameter portion 128 of the fitting 12. The reduced diameter portion 102 of the composite tube 10 is thereby secured to the reduced diameter portion 128 of the fitting 12 to form a mechanical lock. The reduced diameter portion 102 of the composite tube 10 may also bond to the reduced diameter portion of the fitting 12 as the softened resin cools and bonds onto the reduced diameter portion of the fitting. If an adhesive is used between the composite tube and the fitting, the adhesive by itself or in combination with the resin creates a bond between the composite tube and the fitting.

To enhance the mechanical lock between the fitting and the composite tube, a wrap from a composite material may be wound around a reduced diameter portion of the fitting over the tube as shown in FIG. 3. An exemplary embodiment wrap 21 formed by wrapping unidirectional tape such that the fibers are all longitudinally oriented around the hoop direction of the wrap. The wrap is then heated and cured to form the bolstering structure 18 as shown in FIG. 3. To further increase the strength of the joint, a collar 19 which may be made from a composite material or from another material such as a metallic material such as stainless steel, is fitted over the wrap. In an exemplary embodiment, the collar if metallic, may be heated so as to expand to allow for ease of sliding over the wrap. When the collar cools, it shrinks over the wrap providing for a tight fit over the wrap. In an exemplary embodiment, the collar 19 extends beyond both ends of the wrap so as to extend over the flange and over the portion of the tube which is not reduced in diameter, as for example shown in FIG. 3. When a collar is used, the wrap 21 in combination with the collar 19 defines the bolstering structure 18. The wrap member by itself provides for increased mechanical joint strength between the fitting and the tube, as it prevents the tube portion which has the reduced diameter from expanding and thereby preventing the fitting from being withdrawn from the tube end. The strength of the mechanical joint can be further increased by incorporating the collar 19 which provides further resistance to the radial expansion of the reduced diameter tube end.

Figure 6:
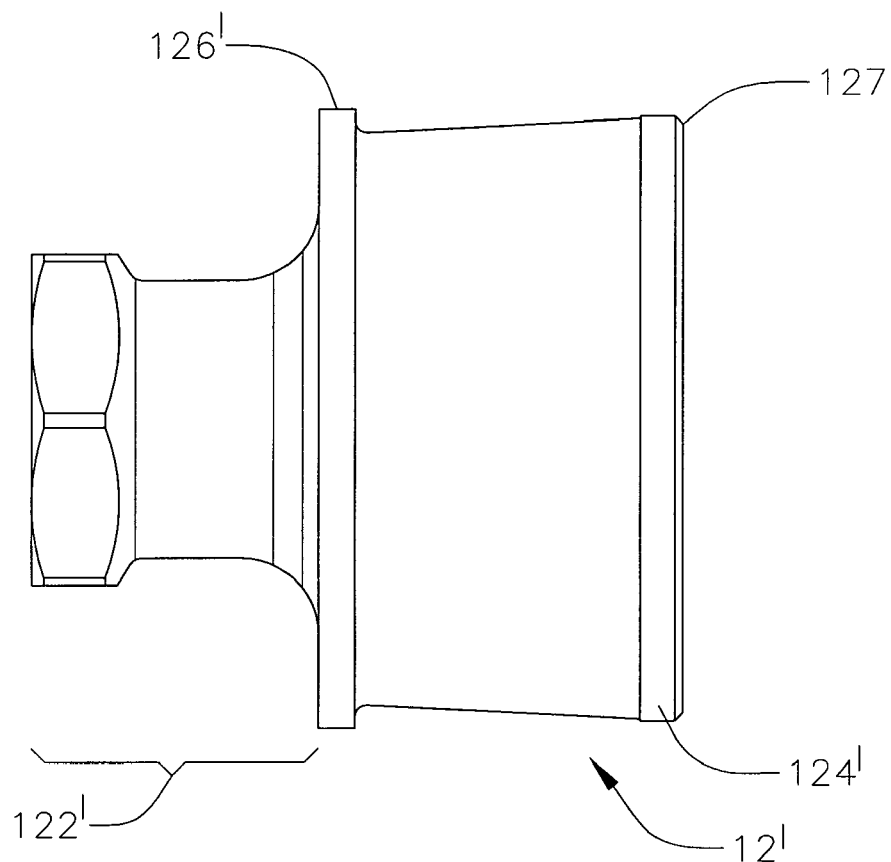
FIG. 6 is a side view of another exemplary embodiment fitting of the present invention for use with an exemplary embodiment composite tube assembly of the present invention.

In another exemplary embodiment, the fitting 12' includes a tapered portion 128' that tapers from an end of the fitting to the flange 126' of the fitting as for example shown in FIG. 6, as well as an end portion 122' for accommodating for example an end fitting 14. In an exemplary embodiment, this tapered portion tapers from a wider diameter at its free end 127 to a narrower diameter at the flange 126'. In an exemplary embodiment, this taper is linear. In an exemplary embodiment, an end portion 124' of the fitting extending from the free end is not tapered and is relatively flat. This end portion serves to guide the fitting within the tube during assembly when the tube is being inserted into the tube in an effort to prevent the fitting from canting relative to the tube.

Figure 7:
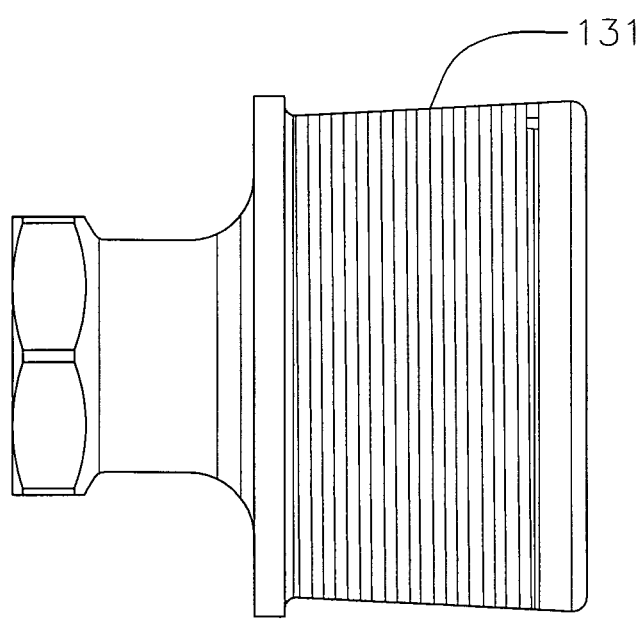
FIG. 7 is an end view of yet another exemplary embodiment fitting of the present invention for use with an exemplary embodiment composite tube assembly of the present invention.

With this exemplary embodiment, an adhesive may be applied on the tapered area of the fitting and/or to the inner surface of the composite tube end portion which will interface with the fitting. The fitting is then fitted into an end of the composite tube. In an exemplary embodiment, the fitting is pushed in until the end of the composite to abuts the flange 126'. The end of the tube is then heated to a temperature sufficient for becoming thermoplastic or moldable, i.e., a temperature sufficient to soften the resin such that it can be molded to the tapered surface. When the heated end molded portion cools, it compresses radially against the fitting tapered outer surface and bonds to the outer surface. With this exemplary embodiment, Applicants discovered that due to the linear tapering of the surface, the end of the tube does not have to be axially slotted to allow for the tube to engage the tapered surface. Moreover, Applicants have discovered that the tube shrinks well enough on the tapered surface without folding over itself during cooling. In an exemplary embodiment, the tapered surface of the insert may be grooved with parallel grooves 131 or by a helical groove 131, as for example shown in FIG. 7. The grooves accommodate the softened resin from the composite tube and/or an adhesive if used, thus, allowing for a stronger bond between the composite tube and the fitting. The spacing and the depth of the grooves are chosen to optimize the bond between the fitting and the tube by accommodating a proper amount of resin and/or adhesive.

A buttress wrap 21' of a composite material which in an exemplary embodiment may include longitudinally oriented fibers and resin which may be wrapped around a portion 150 of the tube extending over the tapered surface of the fitting such that the longitudinal fibers are aligned along the hoop direction. Alternatively the fibers may be aligned in different directions. The wrap may be aligned so as to not extend over the flange edge as for example shown in FIG. 8. In another exemplary embodiment, the wrap may extend over the flange edge. The wrap 21' may be formed by multiple layers of the composite material being wrapped over the tube portion 150. The wrap is then heated and cured onto the outer surface of the tube portion defining a bolstering structure engaging the tapered surface of the fitting. The wrap applies for a radial restraint on the portion 150 of the tube over the tapered surface of the fitting, thereby providing resistance for preventing the tube from expanding and separating from the fitting. In order for the fitting to separate from the tube, the tube portion 150 which has now reduced in diameter and engages the tapered portion of the fitting must expand so as to pass by the wider end portion 124' of the fitting. The wrap, however, provides resistance against such expansion for preventing the separation of the fitting from the tube.

Heating of the wrap to cure it over the tube end creates the risk of actually heating the portion 150 of the tube end which engages the fitting tapered surface and consequently weaken the bond between the tapered surface and the tube end. Thus, in another exemplary embodiment, a collar 19' which is preformed either from a composite material or from another material such as a metallic material such as steel or stainless steel as shown in FIG. 9 is used as the bolstering structure. When formed from a composite material, the collar may be formed from longitudinally oriented fibers along the hoop direction. The fibers may also have other orientations. In an exemplary embodiment, when a collar is used, the inner surface 218 of the collar may be tapered at an angle complementary to the tapered angle defined on the outer surface of the portion 150 of the tube, which is defined when the end portion is reduced in size to engage the tapered outer surface of the fitting. While in an exemplary embodiment, this angle may be the same as the tapering angle of the outer surface of the portion 150 of the tube but in reverse, in other exemplary embodiments, the tapering angle of the inner surface of the collar is not the same as the tapering angle of the outer surface of the portion 150 of the tube.

As the collar with the tapered inner surface is slid over the end of the fitting entry portion 1222' and over the flange 126', it engages the outer surface of the portion of the tube portion 150 fitted over the tapered surface of the fitting. As the collar is further slid, it further engages and provides further radial pressure against the portion 150' of the tube fitted over the tapered outer surface of the fitting. In an exemplary embodiment, the collar is slid far enough so as to not cover the edge surface 126" of the flange. In another exemplary embodiment, however as shown in FIG. 9, the collar is slid far enough so it surrounds at least a portion of each of the flange edge surface 126" and at least a portion of the end portion 150 of the tube. In an exemplary embodiment, the collar surrounds the entire flange edge surface 126". The collar acts the same way as the wrap preventing the separation of the fitting from the tube. However, it is expected that the collar would enhance the integrity and/or strength of the connection between the fitting and the tube end. Furthermore, it is expected that this configuration may be strong enough such that another part of the tube may fail during axial load before the connection between the tube and the fitting. In another exemplary embodiment, the collar may be fitted over the wrap 18' shown in FIG. 8. The wrap and the collar either alone or in combination define the bolstering structure.

Although the present invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by the claims supported by this application and their equivalents rather than the foregoing description.

The invention claimed is:

1. A method for forming a composite tube assembly comprising:
   obtaining a composite tube comprising an end, wherein said composite tube is formed from fibers and a resin;
   obtaining a fitting comprising a first end opposite a second end, said fitting comprising a first constant diameter outer surface section extending from the first end and comprising a first outer diameter, wherein said fitting comprises a second constant diameter outer surface section between said first and second ends having a second outer surface diameter greater than the first outer diameter, and a flange extending from the fitting, the flange having an annular surface extending radially from said first constant diameter outer surface section and a peripheral surface extending transversely from the annular surface;
   inserting the fitting second end and said second constant diameter outer surface section first into the composite tube through the composite tube end followed by at least a portion of the first constant diameter outer surface section, wherein an end portion of said tube surrounds said second constant diameter outer surface section and at least a portion of said first constant diameter outer surface section;
   heating said tube end portion to soften the resin;
   radially compressing said tube end portion onto said second constant diameter outer surface section and onto at least a portion of said first constant diameter outer surface section;
   surrounding said compressed tube end portion with a bolstering structure extending axially from the annular surface and;
   placing a collar over the bolstering structure and engaging the peripheral surface of the flange.

2. The method as recited in claim 1 wherein surrounding said compressed end tube portion with a bolstering structure comprises:
   wrapping said compressed tube end portion with a material comprising fibers and resin; and
   curing said wrapped material onto said compressed end tube portion to form said bolstering structure.

3. The method as recited in claim 1 wherein the fitting further comprises a tapered outer surface annular section between said two constant diameter outer surface sections, wherein said tapered outer surface section tapers radially inward in a direction toward the first end.

4. The method as recited in claim 3 wherein inserting comprises inserting the fitting second end into the composite tube end until the composite tube end abuts the flange.

5. The method as recited in claim 4 wherein surrounding said compressed end tube portion with a bolstering structure comprises:
   wrapping said compressed tube end portion with a material comprising fibers and resin, said material abutting said flange annular surface; and
   curing said wrapped material onto said compressed end tube portion to form said bolstering structure.

6. The method as recited in claim 5 wherein placing a collar comprises placing a collar surrounding and engaging said bolstering structure.

7. The method as recited in claim 1 wherein placing a collar comprises placing a collar surrounding and engaging said bolstering structure.

8. The method as recited in claim 1 wherein said fitting second constant diameter outer surface section comprises an outer surface having at least a groove.

9. The method as recited in claim 1 further comprising placing an adhesive between said tube end portion and said fitting second constant diameter outer surface section.

* * * * *